Dec. 9, 1952 M. BITZER 2,620,630
BOOSTER PUMP FOR AUTOMOTIVE ACCESSORIES
Filed March 3, 1949

INVENTOR
*Martin Bitzer*
BY
*Bean, Brooks, Buckley & Bean.*
ATTORNEYS

Patented Dec. 9, 1952

2,620,630

UNITED STATES PATENT OFFICE 2,620,630

BOOSTER PUMP FOR AUTOMOTIVE ACCESSORIES

Martin Bitzer, Kenmore, N. Y., assignor to Trico Products Corporation, Buffalo, N. Y.

Application March 3, 1949, Serial No. 79,494

5 Claims. (Cl. 60—60)

This invention relates to the automotive accessory art and more particularly to the fluid pressure actuated field.

Considerable attention has been given in the past to the thought of providing a satisfactory source of pressure, either negative or positive, by which the fluid actuated accessories of motor vehicles may be operated in a practical manner whenever desired. According to the present invention, a compressor is provided as an alternate source of operating pressure which may be designed for use in conjunction with the intake manifold of an automobile engine, or in association with any other source of pressure which fluctuates throughout a wide range between degrees of sufficiency and insufficiency.

The primary object of the present invention is to provide a compressor unit adapted for being interposed in the suction line from the primary source and which will serve in an efficient manner to supply an adequate pressure at all times when the primary source is either insufficient or wholly lacking.

A further object of the invention is to provide a generator unit which is of unique construction and readily responsive to the fluctuation pressure for maintaining efficient performance of the accessory.

Figure 1:
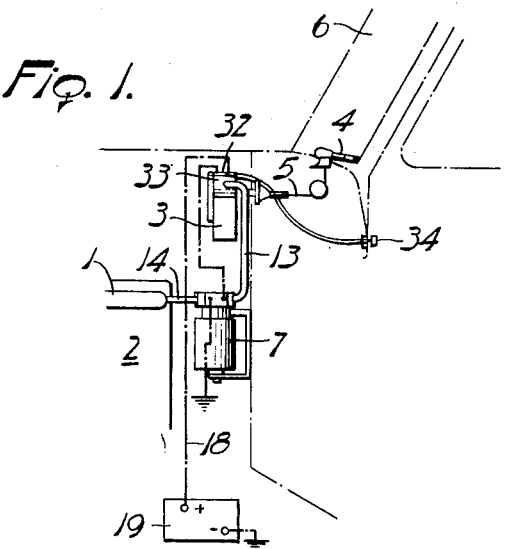
Figures 2, 3:
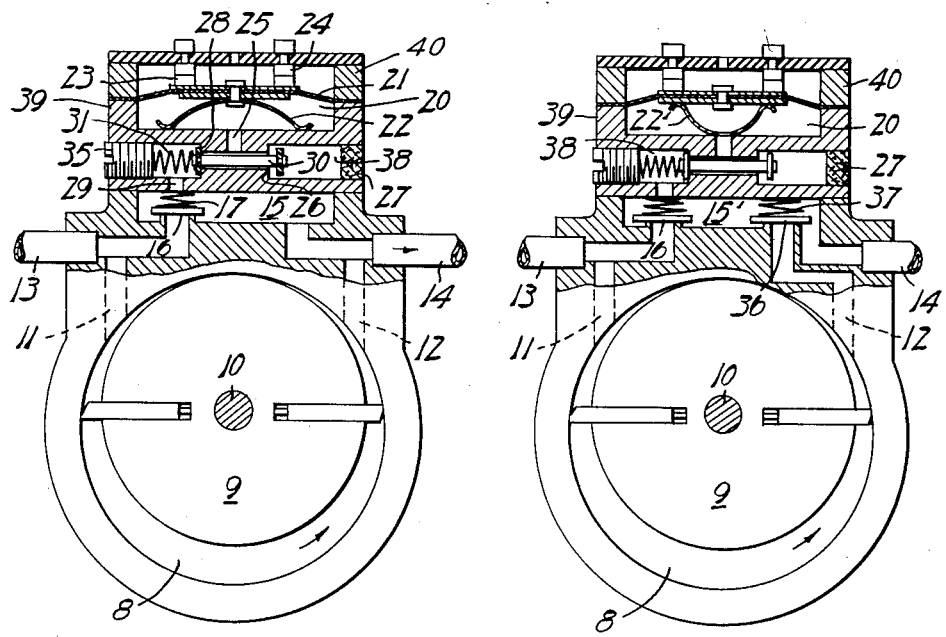

The foregoing and additional objects will manifest themselves as the following description progresses, wherein reference is made to the accompanying drawing showing In Fig. 1 a practical application of the invention;

In Fig. 2 a sectional view of the compressor unit; and

In Fig. 3 a slightly modified form of unit.

Referring more particularly to the drawing, the numeral 1 designates the intake manifold of the motor vehicle engine 2, and 3 designates a fluid motor of an accessory, such as a windshield cleaner, to which motor the wiper 4 is operatively connected by a transmission cable 5 for being oscillated across the windshield cleaner surface 6.

The compressor unit comprises an electric motor 7 and a pump of suitable construction and preferably of the rotary type illustrated. Such pump has a chamber 8 and a bladed rotor 9 therein, the latter being preferably carried by a shaft 10 that is coaxial with and may be a part of the electric motor shaft. The chamber has an inlet 11 and an outlet 12, the inlet being connected to the accessory 3 by a conduit 13 while the outlet is joined to the intake manifold by a conduit 14 so that the pump will discharge into the intake manifold. A shunt passage or chamber 15 connects the inlet and outlet passages in bypass relation to the motor chamber, 8 and a check valve 16 closed by a spring 17 determines one-way air flow through the shunt passage when the manifold suction is ample for accessory operation.

A pressure responsive switch is interposed in the circuit 18 for the electric motor 7 and the battery 19. As illustrated in Figs. 2 and 3, the switch has a pressure compartment 20, a pressure responsive member 21 therein, and a spring 22 acting to urge the member carried contacts 23 into circuit closing relation with the fixed contacts 24. The pressure compartment is normally opened to the outside atmosphere through a port 25, a valve seat or vent 26, and a filter 27. It is adapted to be opened to the manifold suction through the port 25, an oppositely facing valve seat or orifice 28, and a second port 29 into the shunt passage. A dual valve element 30, comprising a valve for each seat and an interposed spacer connecting the two valves in a unit, is normally positioned by a spring 31 to close off the suction communication and to vent the pressure compartment 20. However, when the manifold suction increases to an efficient degree it will overcome the urge of the spring 31 and quickly snap the valve unit to close the vent 26 and open the orifice 28. Should the manifold influence fail the spring 22 will condition the pump circuit ready for performance upon the manual closing of the accessory switch 32 at the time the fluid accessory control valve 33 is opened, as by manipulating the knob 34.

The valve unit enables the build up of a predetermined pressure differential before the suction communication opens. This snap action is definite in its operation and eliminates the otherwise chattering of and arcing between the switch contacts. The urge of the spring 31 may be regulated by a backing screw 35 to make the sensitiveness of the valve 30 different from that of the switch.

In the modification a second valve 36 is arranged in the shunt passage 15' to close the pump outlet 12' against a back pressure reaction between the discharge pulsations, a spring 37 yieldably holding the valve shut. The diaphragm spring 22' may be rearranged for the best advantage.

The compressor, which term comprehends either a negative or a positive pressure generator, is definite in its response to the manifold suction and provides a constant and uniform supply of negative pressure. Or it may satisfactorily serve as a reliable source of positive pressure by connecting its outlet to the accessory. The snap-acting valve unit 30, 31, is mounted within a valve chamber 38 provided in a removable intermediate section 39 by which access may be had to the shunt passage 15 (15'). A top section 40 cooperates with the section 39 in clamping the diaphragm 21 in place. The valve 30 is readily accessible from either end of its chamber either by removal of the filter 27 or the screw 35.

The foregoing description has been given in detail without thought of limitation since the inventive principles involved are capable of assuming other physical embodiments without departing from the spirit of the invention and the scope of the appended claims.

What is claimed is:

1. A compressor unit comprising an electric motor having an armature shaft, a rotary suction pump having a chamber with a rotor therein driven by the armature shaft, said chamber being mounted on the motor housing and having inlet and outlet ports opening into the chamber with a shunt passage connecting the two ports in bypass relation to the rotor chamber, the outlet port adapted for connection to a source of fluctuating suction, a pressure responsive switch having a pressure compartment connected to the shunt passage by a pressure equalizing duct, said switch being connected in circuit relation to the motor for energizing the latter when the shunt passage suction influence is low, said compartment having an atmospheric vent, and a valve unit normally closing the duct to the shunt passage and opening the vent to the atmosphere and shifting in response to the suction influence in the shunt passage to close the vent to the atmosphere while opening the duct to such influence for opening the switch.

2. A compressor unit comprising an electric motor having an armature shaft, a rotary suction pump having a chamber with a rotor therein driven by the armature shaft, said chamber being mounted on the motor housing and having inlet and outlet ports opening into the chamber with a shunt passage connecting the two ports in bypass relation to the rotor chamber, the outlet port adapted for connection to a source of fluctuating suction, a pressure responsive switch having a pressure compartment connected to the shunt passage by a pressure equalizing duct, said switch being connected in circuit relation to the motor for energizing the latter when the shunt passage suction influence is low, said compartment having an atmospheric vent, and a valve unit normally closing the duct to the shunt passage and opening the vent to the atmosphere and shifting in response to the suction influence in the shunt passage to close the vent to the atmosphere while opening the duct to such influence for opening the switch, and a spring yieldably holding the valve unit in its normal position and acting to determine the degree of suction influence at which it will shift thereby to insure a complete opening of the switch.

3. A compressor unit comprising an electric motor having an armature shaft, a rotary suction pump having a chamber with a rotor therein driven by the armature shaft, said chamber being mounted on the motor housing and having inlet and outlet ports opening into the chamber with a shunt passage connecting the two ports in bypass relation to the rotor chamber, the outlet port adapted for connection to a source of fluctuating suction, a pressure responsive switch having a pressure compartment connected to the shunt passage by a pressure equalizing duct, said switch being connected in circuit relation to the motor for energizing the latter when the shunt passage suction influence is low, said compartment having an atmospheric vent, a valve unit normally closing the duct to the shunt passage and opening the vent to the atmosphere and shifting in response to the suction influence in the shunt passage to close the vent to the atmosphere while opening the duct to such influence for opening the switch, a spring yieldably holding the valve unit in its normal position and acting to determine the degree of suction influence at which it will shift thereby to insure a complete opening of the switch, and means to regulate the spring force for varying such determined degree of suction for the opening of the switch.

4. In combination with the intake manifold of a motor vehicle engine, and a suction actuated accessory, a compressor unit comprising an electric motor, a rotary suction pump having a chamber with a rotor therein driven by the motor, said chamber having inlet and outlet ports opening into the chamber with a shunt passage connecting the two ports in bypass relation to the chamber, a pressure responsive switch having a pressure compartment connected to the shunt passage by a duct, the outlet port being connected to the intake manifold and the inlet port being connected to the accessory, said switch being connected in circuit relation to the motor for energizing the latter when the intake manifold suction influence is low, said compartment having an atmospheric vent, and a valve unit normally closing the duct to the shunt passage and opening the vent to the atmosphere and shifting in response to the suction influence in the shunt passage to close the vent to the atmosphere while opening the duct to such influence for opening the switch.

5. A compressor unit comprising an electric motor having an armature shaft, a rotary suction pump having a chamber with a rotor therein driven by the armature shaft, said chamber having inlet and outlet ports opening into the chamber with a shunt passage connecting the two ports in bypass relation to the rotor chamber, a pressure responsive switch having a pressure compartment connected to the shunt passage by a pressure equalizing duct, said switch being connected in circuit relation to the motor, said compartment having an atmospheric vent, and a valve unit normally closing the duct to the shunt passage and opening the vent to the atmosphere and being shiftable to close the vent to the atmosphere and the duct to the shunt passage, with a spring yieldably holding the valve unit in its normal position.

MARTIN BITZER.

REFERENCES CITED

The following references are of record in the file of this patent:

UNITED STATES PATENTS

| Number | Name | Date |
| --- | --- | --- |
| 908,692 | Norland | Jan. 5, 1909 |
| 1,018,594 | Turner | Feb. 27, 1912 |
| 1,165,562 | Wynn, Jr. | Dec. 28, 1915 |
| 2,032,321 | Hueber et al. | Feb. 25, 1936 |
| 2,084,730 | Gill, Sr. | June 22, 1937 |
| 2,279,431 | Aikman | Apr. 14, 1942 |
| 2,293,542 | Hamilton | Aug. 18, 1942 |
| 2,376,937 | Pierotti | May 29, 1945 |
| 2,492,075 | Van Atta | Dec. 20, 1949 |